United States Patent
Kim et al.

(10) Patent No.: US 8,346,277 B2
(45) Date of Patent: Jan. 1, 2013

(54) TERMINAL HAVING FUNCTION FOR MANAGING POSITION INFORMATION AND PROGRAM RECORDED MEDIUM

(75) Inventors: Hyong-Won Kim, Gyeonggi-do (KR); Tae-Sook Yoon, Incheon-si (KR)

(73) Assignee: LG Electronics Inc., Seoul (KR)

( * ) Notice: Subject to any disclaimer, the term of this patent is extended or adjusted under 35 U.S.C. 154(b) by 523 days.

(21) Appl. No.: 12/195,276

(22) Filed: Aug. 20, 2008

(65) Prior Publication Data
US 2009/0054086 A1    Feb. 26, 2009

(30) Foreign Application Priority Data
Aug. 20, 2007    (KR) .......................... 10-2007-0083491

(51) Int. Cl.
*H04W 24/00*    (2009.01)
(52) U.S. Cl. .................................... 455/456.1; 455/457
(58) Field of Classification Search ............... 455/456.1, 455/457
See application file for complete search history.

(56) References Cited

U.S. PATENT DOCUMENTS

| | | | |
|---|---|---|---|
| 6,424,910 B1 * | 7/2002 | Ohler et al. | 701/202 |
| 2003/0027558 A1 | 2/2003 | Eisinger | |
| 2005/0283308 A1 | 12/2005 | Szabo et al. | |
| 2006/0155460 A1 | 7/2006 | Raney | |
| 2006/0183486 A1 * | 8/2006 | Mullen | 455/456.1 |
| 2008/0167938 A1 * | 7/2008 | Meisels et al. | 705/9 |
| 2008/0171555 A1 * | 7/2008 | Oh et al. | 455/456.1 |

FOREIGN PATENT DOCUMENTS
EP    1434032    6/2004

* cited by examiner

*Primary Examiner* — Kamran Afshar
*Assistant Examiner* — Omoniyi Obayanju
(74) *Attorney, Agent, or Firm* — Lee, Hong, Degerman, Kang & Waimey

(57) ABSTRACT

A wireless communication terminal having a wireless communication unit and a display is able to receive location information about the position of the terminal, remote terminal s, and at least one third location. The terminal obtains route information from the terminal to the at least one third location, from the terminal to the remote terminals, and from the remote terminals to the at least one third location, and displays travel routes between the locations. The terminal also obtains travel information comprising speed, estimated travel time, and travel direction from the terminal and the remote terminals, and displays travel progress of the terminal and the remote terminals.

21 Claims, 17 Drawing Sheets

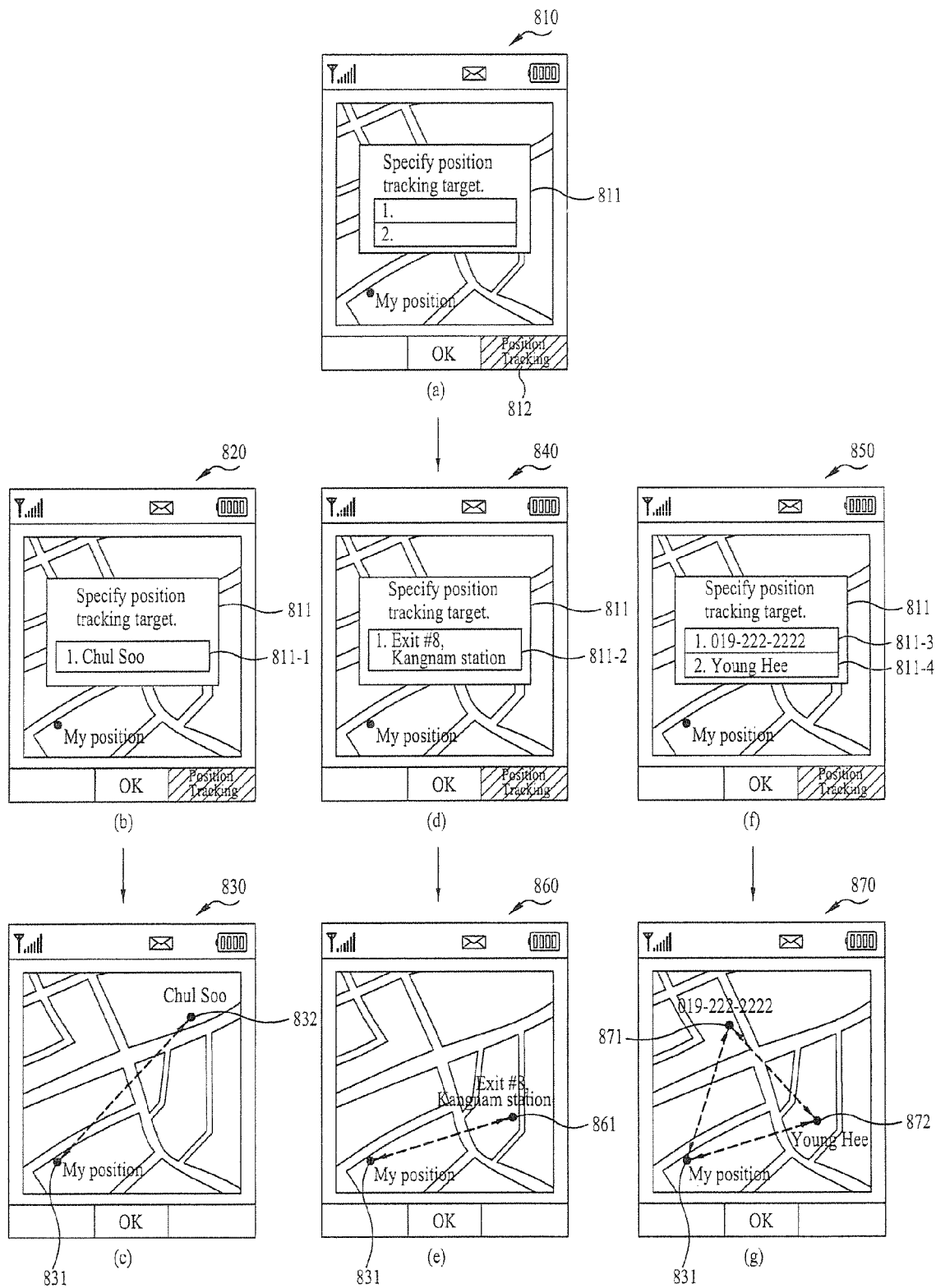

TERMINAL HAVING FUNCTION FOR MANAGING POSITION INFORMATION AND PROGRAM RECORDED MEDIUM

CROSS-REFERENCE TO RELATED APPLICATIONS

Pursuant to 35 U.S.C. §119(a), this application claims the benefit of earlier filing date and right of priority to Korean Patent Application No. 10-2007-0083491 filed on Aug. 20, 2007, the contents of which are hereby incorporated by reference herein in its entirety.

FIELD OF THE INVENTION

The present invention relates to a terminal and program recorded medium, and more particularly, to a terminal having a function for managing position information and a position information managing method recorded medium.

DISCUSSION OF THE RELATED ART

A terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, terminals have been configured to receive broadcast and multicast signals which permit viewing of content such as videos and television programs.

Efforts are ongoing to support and increase the functionality of terminals. Such efforts include software and hardware improvements, as well as changes and improvements in the structural components which form the terminal.

In particular, a terminal having a navigation system is capable of providing real-time map information in which a user-set route from an origin to a destination and a position of the terminal are contained.

However, the related art terminal is too complicated for a user to input a necessary destination to a route setting by manipulating key buttons.

Moreover, the related art fails to provide a method of setting a new location using information of a plurality of position locations.

SUMMARY OF THE INVENTION

Accordingly, the present invention is directed to a terminal, method, and system that substantially obviate one or more problems due to limitations and disadvantages of the related art.

An object of the present invention is to provide a terminal, method, and system by which new position information of remote terminals and locations can be obtained.

Another object of the present invention is to provide a terminal, method, and system by which information on travel routes from the locations of the remote terminals to a new location can be provided and displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terminal according to the present invention includes a wireless communication unit for receiving position information of the terminal, at least one remote terminal, and at least one destination. The terminal also includes a controller for determining route information between the terminal and the at least one destination, and between the at least one remote terminal and the at least one destination.

In another aspect of the present invention, a method includes receiving position information of the terminal, at least one remote terminal, and at least one destination, and determining route information between the terminal and the at least one destination, and between the at least one remote terminal and the at least one destination. The method also includes displaying travel information between the terminal and the at least one destination, and between the at least one remote terminal and the at least one destination, wherein the travel information comprises at least one of distance, speed, estimated travel time, and direction of travel.

The terminal also transmits the position information of the at least one destination to the at least one remote terminal and receives from the remote terminal the route information between the at least one remote terminal and the at least one destination. The terminal also transmits to the at least one remote terminal the route information between the terminal and the at least one destination.

In another aspect of the present invention, a route information system includes a terminal for receiving position information of the terminal, at least one remote terminal, and at least one destination, and a server for transmitting position information of the terminal, the at least one remote terminal, and the at least one destination. The terminal transmits the position information of the at least one destination to the server and receives from the server the route information between the at least one remote terminal and the at least one destination, wherein the travel information comprises at least one of distance, speed, estimated travel time, and direction of travel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram to explain a process for specifying a terminal having position information;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
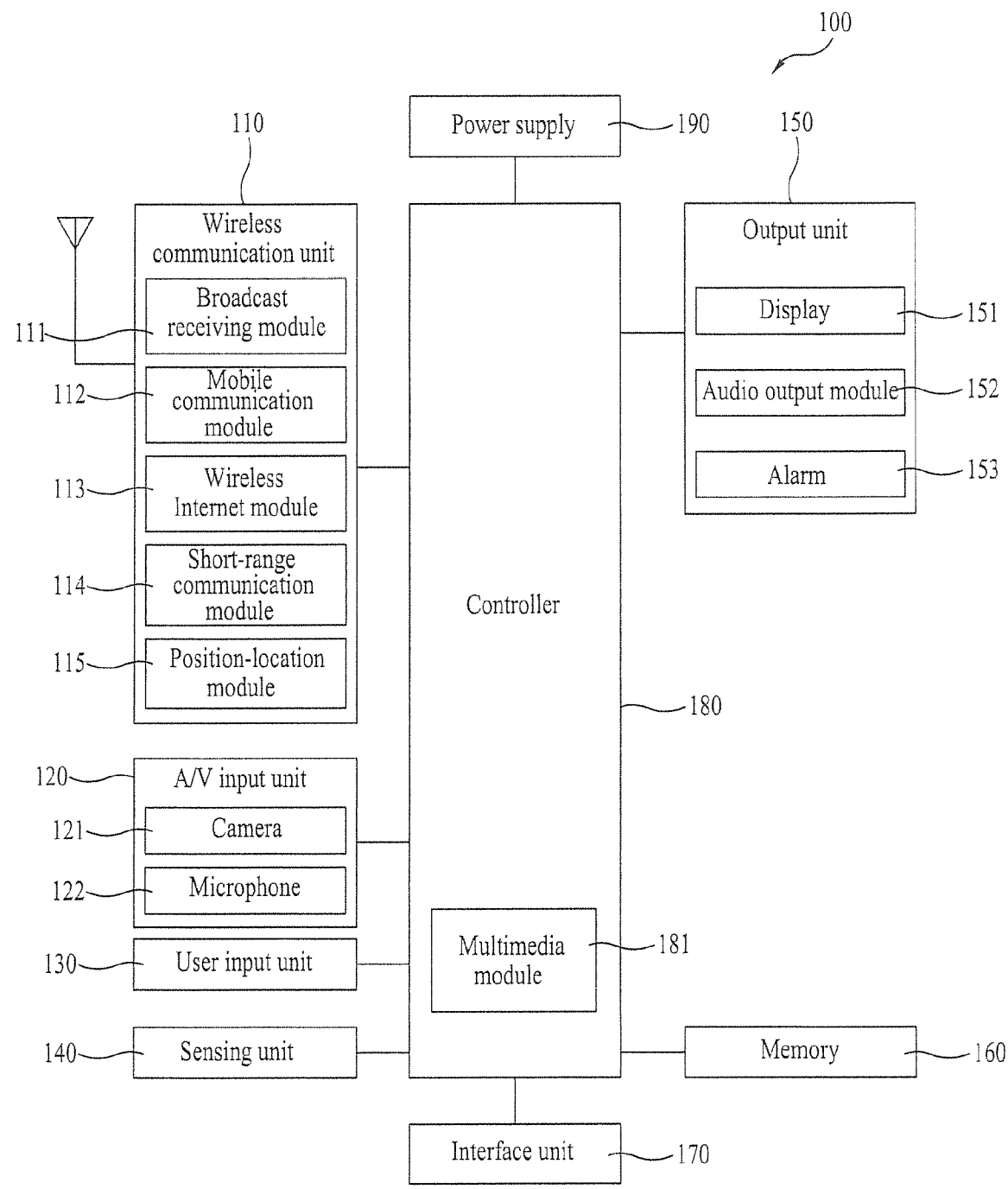
FIG. 1 is a block diagram of a terminal in accordance with an embodiment of the present invention.

FIG. 1 is a block diagram of terminal (or mobile terminal) 100 in accordance with an embodiment of the present invention. The terminal may be implemented using a variety of different types of terminals. Examples of such terminals include mobile phones, user equipment, smart phones, computers, digital broadcast terminals, personal digital assistants, portable multimedia players (PMP), and navigators. By way of non-limiting example only, further description will be with regard to a terminal. However, such teachings apply equally to other types of terminals. FIG. 1 shows the terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the terminal 100 and a wireless communication system or network within which the terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless Internet module 113 supports Internet access for the terminal. This module may be internally or externally coupled to the terminal 100.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth® and ZigBee®, to name a few.

Position-location module 115 identifies or otherwise obtains the location of the terminal 100. If desired, this module may be implemented using global positioning system (GPS) components which cooperate with associated satellites, network components, and combinations thereof.

Audio/video (A/V) input unit 120 is configured to provide audio or video signal input to the terminal 100. As shown, the A/V input unit 120 includes a camera 121 and a microphone 122. The camera 121 receives and processes image frames of still pictures or video.

The microphone 122 receives an external audio signal while the portable device is in a particular mode, such as phone call mode, recording mode and voice recognition. This audio signal is processed and converted into digital data. The portable device, and in particular A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones 122 and/or cameras 121 may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the terminal. For instance, the sensing unit may detect an open/close status of the terminal, relative positioning of components (e.g., a display and keypad) of the terminal, a change of position of the terminal or a component of the terminal, a presence or absence of user contact with the terminal, orientation or acceleration/deceleration of the terminal. As an example, consider the terminal 100 being configured as a slide-type terminal. In this configuration, the sensing unit 140 may sense whether a sliding portion of the terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the terminal 100. Display 151 is typically implemented to visually display information associated with the terminal 100. For instance, if the terminal 100 is operating in a phone call mode, the display 151 will generally provide a user interface or graphical user interface which includes information associated with placing, conducting, and terminating a phone call. As another example, if the terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The terminal may include one or more of such displays. An example of a two-display embodiment is one in which one display is configured as an internal display (viewable when the terminal 100 is in an opened position) and a second display configured as an external display (viewable in both the open and closed positions).

FIG. 1 further shows output unit 150 having an audio output module 152 which supports the audio output requirements of the terminal 100. The audio output module 152 is often implemented using one or more speakers, buzzers, other audio producing devices, and combinations thereof. The audio output module 152 functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the terminal 100. Typical events include call received, message received and user input received. An example of such output includes the providing of tactile sensations (e.g., vibration) to a user. For instance, the alarm 153 may be configured to vibrate responsive to the terminal 100 receiving a call or message. As another example, vibration is provided by alarm 153 responsive to receiving user input at the terminal 100, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the terminal 100. Examples of such data include program instructions for applications operating on the terminal 100, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the terminal 100. For instance, the controller performs the control and processing associated with voice calls, data communications, video calls, camera operations and recording operations. If desired, the controller may include a multimedia module 181 which provides multimedia playback. The multimedia module 181 may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Terminal 100 may be implemented in a variety of different configurations. Examples of such configurations include folder-type, slide-type, bar-type, rotational-type, swing-type and combinations thereof. For clarity, further disclosure will primarily relate to a slide-type terminal. However such teachings apply equally to other types of terminals.

Figure 2:
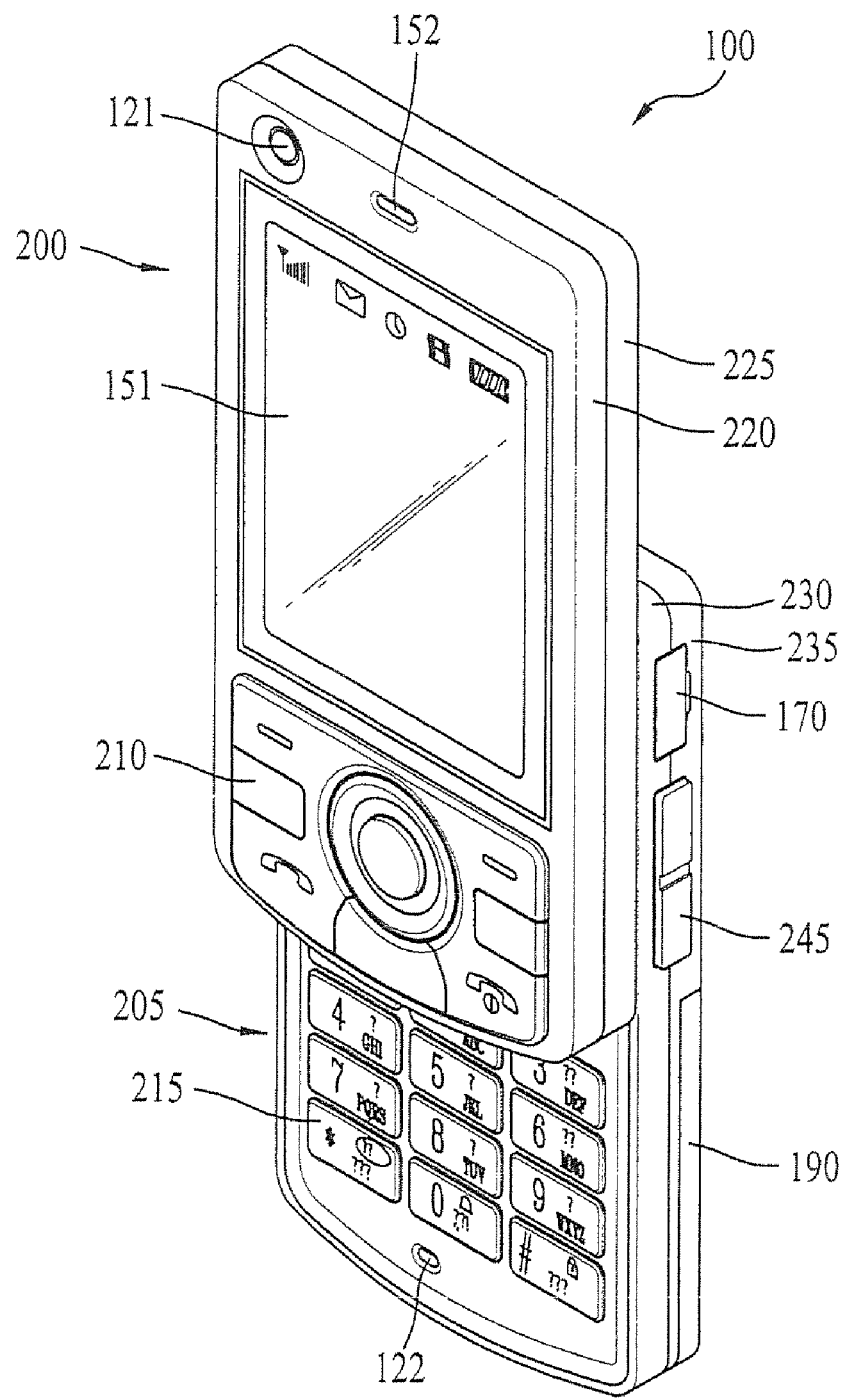
FIG. 2 is a perspective view of a front side of a terminal according to an embodiment of the present invention.

FIG. 2 is a perspective view of a front side of a terminal 100 according to an embodiment of the present invention. In FIG. 2, the terminal 100 is shown having a first body 200 configured to slideably cooperate with a second body 205. The user input unit 130 (described in FIG. 1) is implemented using function keys 210 and keypad 215. The function keys 210 are associated with first body 200, and the keypad 215 is associated with second body 205. The keypad 215 includes various keys (e.g., numbers, characters, and symbols) to enable a user to place a call, prepare a text or multimedia message, and otherwise operate the terminal.

The first body 200 slides relative to second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The terminal 100 is operable in either a standby mode (e.g., able to receive a call or message, receive and respond to network control signaling), or an active call mode. Typically, the terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first 220, 230 and second cases 225, 235 of one or both of the first and second bodies 200, 205. The first and second bodies 200, 205 are typically sized to receive electronic components necessary to support operation of the terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit 130, positioned along the side of second body 205. Preferably, the side keys 245 may be configured as hot keys, such that the side keys are associated with a particular function of the terminal. An interface unit 170 is shown positioned adjacent to the side keys 245, and a power supply 190 in a form of a battery is located on a lower portion of the second body 205.

Figure 3:
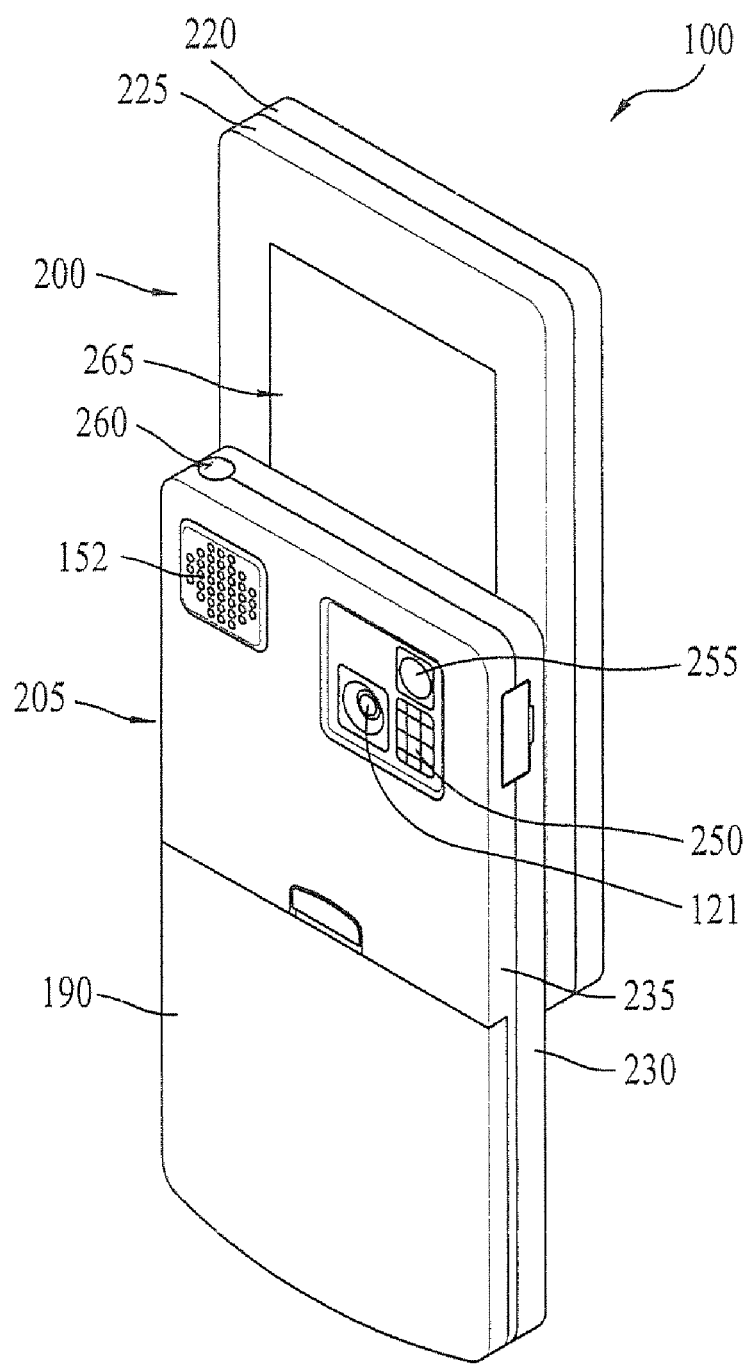
FIG. 3 is a rear view of the terminal shown in FIG. 2.

FIG. 3 is a rear view of the terminal 100 shown in FIG. 2. FIG. 3 shows the second body 205 having a camera 121, and an associated flash 250 and mirror 255. The flash 250 operates in conjunction with the camera 121 of the second body 205. The mirror 255 is useful for assisting a user to position camera 121 in a self-portrait mode. The camera 121 of the second body 205 faces a direction which is opposite to a direction faced by camera 121 of the first body 200 (FIG. 2). Each of the cameras 121 of the first 200 and second 205 bodies may have the same or different capabilities.

In an embodiment, the camera 121 of the first body 200 operates with a relatively lower resolution than the camera of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules 150 of the first and second bodies 200, 205, may cooperate to provide stereo output. Moreover, either or both of these audio output modules 150 may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

Figure 4:
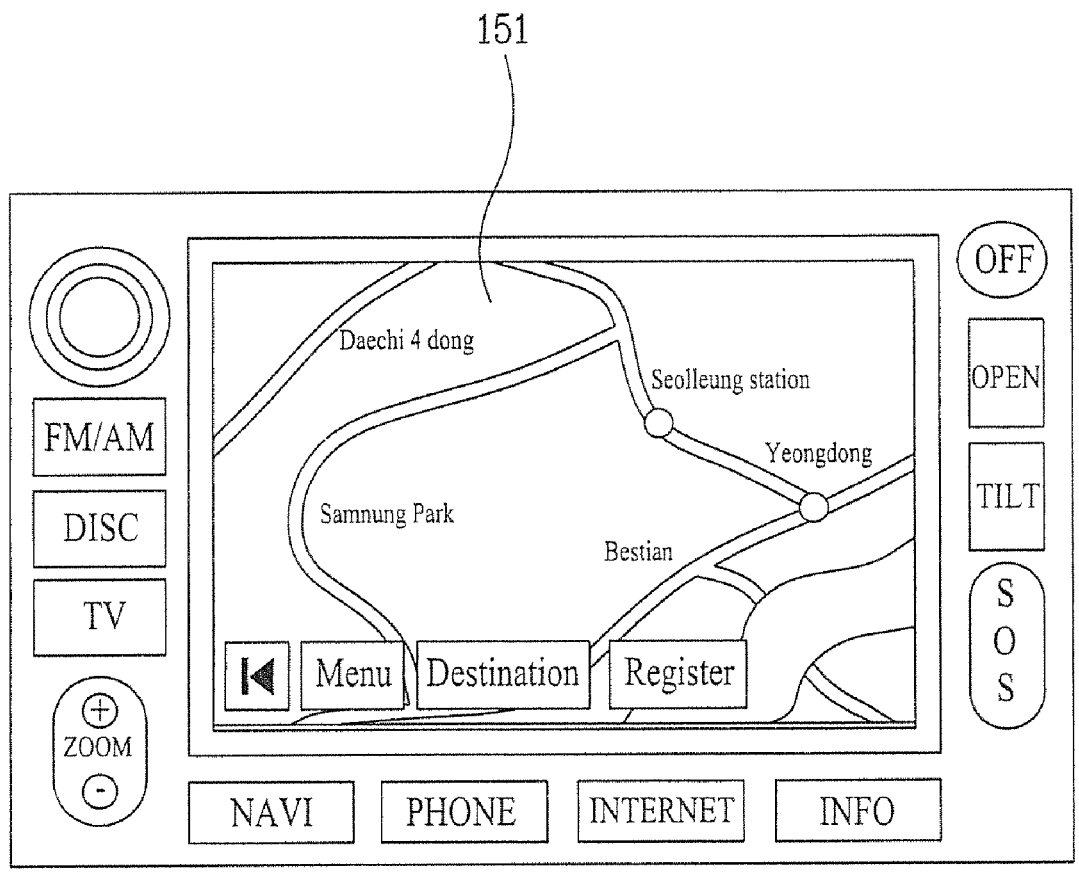
FIG. 4 is a diagram of a vehicle navigation system having a display module for displaying an image of a road guide service.
Figure 5:
FIG. 5 is a diagram of a vehicle navigation system fixed to a vehicle.

The terminal 100 according to the present invention can be implemented in a vehicle navigation system, as shown in FIG. 4 and FIG. 5, as well as the mobile phone shown in FIG. 2 or FIG. 3.

FIG. 4 shows a vehicle navigation system having a display module 151 for displaying a navigation route; and FIG. 5 shows a vehicle navigation system fixed within a vehicle.

It is understood that the vehicle navigation system shown in FIG. 4 and FIG. 5 can be detachably provided to a vehicle, the mobile phone type terminal 100 shown in FIG. 2 or FIG. 3 can be detachably provided to a vehicle and is able to sufficiently perform a vehicle navigation function.

The terminal 100 of FIGS. 1-5 may be configured to operate within a communication system which transmits data via frames or packets, including both wireless and wireline communication systems, and satellite-based communication systems. Such communication systems utilize different interfaces and/or physical layers.

Examples of such interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

In the following description, a system including a terminal according to the present invention is explained with reference to FIG. 6.

Figure 6:
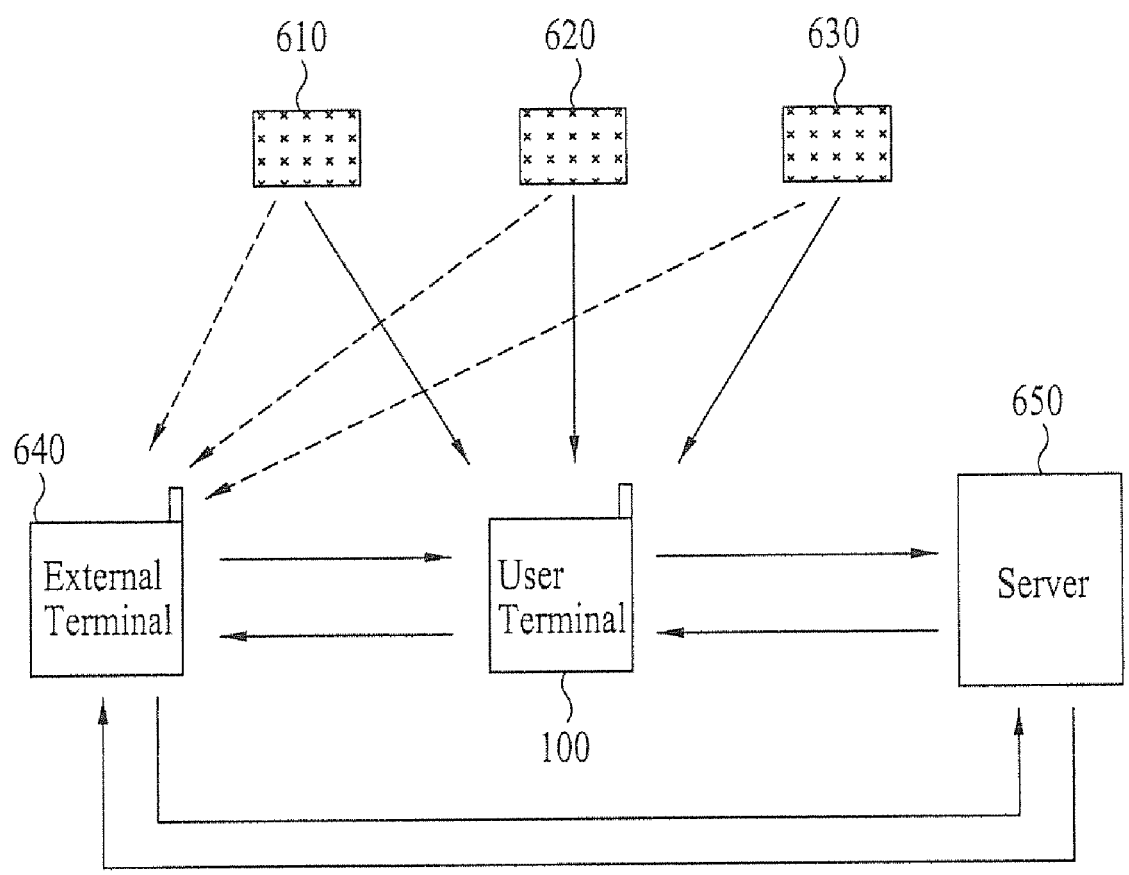
FIG. 6 is a diagram of a system including a terminal according to one embodiment of the present invention.

FIG. 6 is a diagram of a system including the terminal 100 according to one embodiment of the present invention, wherein the terminal receives position information from one or more satellites 610, 620 and 630 through the position-location module 115 (FIG. 1). The terminal 100 is able to generate position information for providing a position based service using the received position information.

The terminal 100 is able to transmit and receive position information and other information required for the position based service from an external terminal 640.

Figure 7:
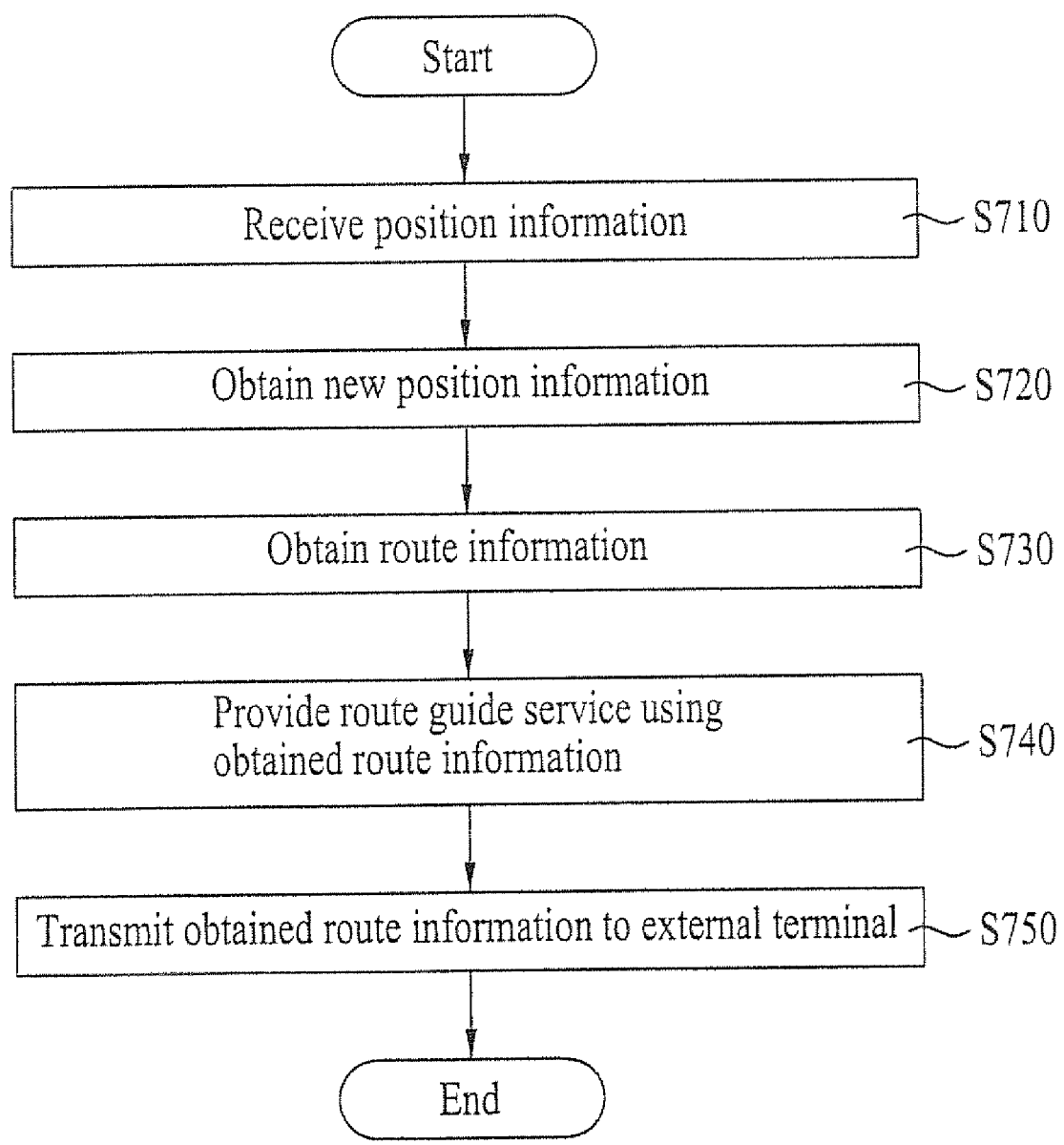
FIG. 7 is a flowchart of a method of managing position information, which is implemented by a program according to one embodiment of the present invention.

A method of managing position information according to the present invention is explained with reference to FIG. 7. FIG. 7 is a flowchart of a method of managing position information, which is implemented by a program according to one embodiment of the present invention. The terminal 100 receives its position information of a user terminal (equivalent to the former terminal 100) [S710].

If the terminal 100 enters a navigation mode, the terminal 100 activates the position-location module 115 and then receives position information of the user terminal 100 from at least one of the satellites 610, 620 and 630. According to the current technology, terminal 100 receives position information from at least three satellites. In this case, the position information contains a latitude, longitude and altitude, speed information and time information.

Terminal 100 is able to retrieve position information on an external terminal or place.

In this case, a user provides at least one piece of identification information (e.g., phone number) of the external terminal 640 or a name of the specific place. If so, the terminal 100 is able to receive position information corresponding to at least one of the identification number and the name.

For example, in FIG. 6, the terminal 100 makes a request for an external terminal 640, or for an external server 650, to transmit position information of the external terminal 640 for which the identification number is provided. The terminal 100 is then able to receive the position information of the external terminal 640 from the external terminal 640 or the external server 650 correspondingly.

Moreover, the terminal 100 is able to store the position information of the specific place, in the memory 160 in advance, according to a name or number. In this case, the terminal 100 is able to periodically receive current position information of each terminal or location from the external server 650 and then store and update the memory.

A process for specifying a terminal receiving position information in the receiving step [S710] is explained in detail with reference to FIG. 8. The terminal 100 displays a map on which its position ('my position') is marked on a screen. If a user selects position tracking 812 for enabling a position tracking command of a specific place/terminal (FIG. 8a), the terminal 100 displays a window 811 for enabling an object to be tracked.

Referring to (b) and (c) of FIG. 8, if 'Chul Soo' is a tracking target, the terminal 100 displays 'my position' 831 and Chul Soo's position 832 on a map. The terminal 100 stored a phone number of 'Chul Soo' in the memory 160 in advance. The position of Chul Soo's terminal means a position of a terminal having the phone number of 'Chul Soo' and 'my position' means a position of the terminal 100.

Referring to (d) and (e) of FIG. 8, if 'exit #8 of Kangnam station' is a tracking target, the terminal 100 displays locations corresponding to 'my position' 831 and to 'exit #8 of Kangnam station' 861 on the map.

Referring to (f) and (g) of FIG. 8, if '019-222-2222' and 'Young Hee' are position tracking targets, the terminal 100 displays 'my position' 831, 'position of a terminal having a phone number 019-222-2222' 871 and 'position of a terminal corresponding to Young Hee' 872 on the map.

In the above-explained states, (c), (e) and (g), the terminal 100 displays a straight line connecting 'my position' 831 and positions of Chul Soo 832, Exit 8 861, and terminals for phone number 019-222-2222 871 and Young Hee 872 thereby enabling a user to visually recognize straight-line distances between a plurality of tracked positions.

Referring now to FIG. 7, the terminal 100 receives new position information [S720]. For instance, the terminal 100 is able to obtain or update new position information using at least one of traveling distances, traveling times, traveling speeds between the received position information. If a condition for obtaining new position information is provided by a user, the terminal 100 is able to obtain new position information corresponding to the provided condition. The terminal 100 is able to automatically determine new positions corresponding to the tracking targets.

Obtaining new position information based on a plurality of position information according to the present invention is explained with reference to FIGS. 9A to 9F as follows. FIGS. 9A to 9F are diagrams of a screen images for obtaining new position information according to one embodiment of the present invention.

Figure 9A:
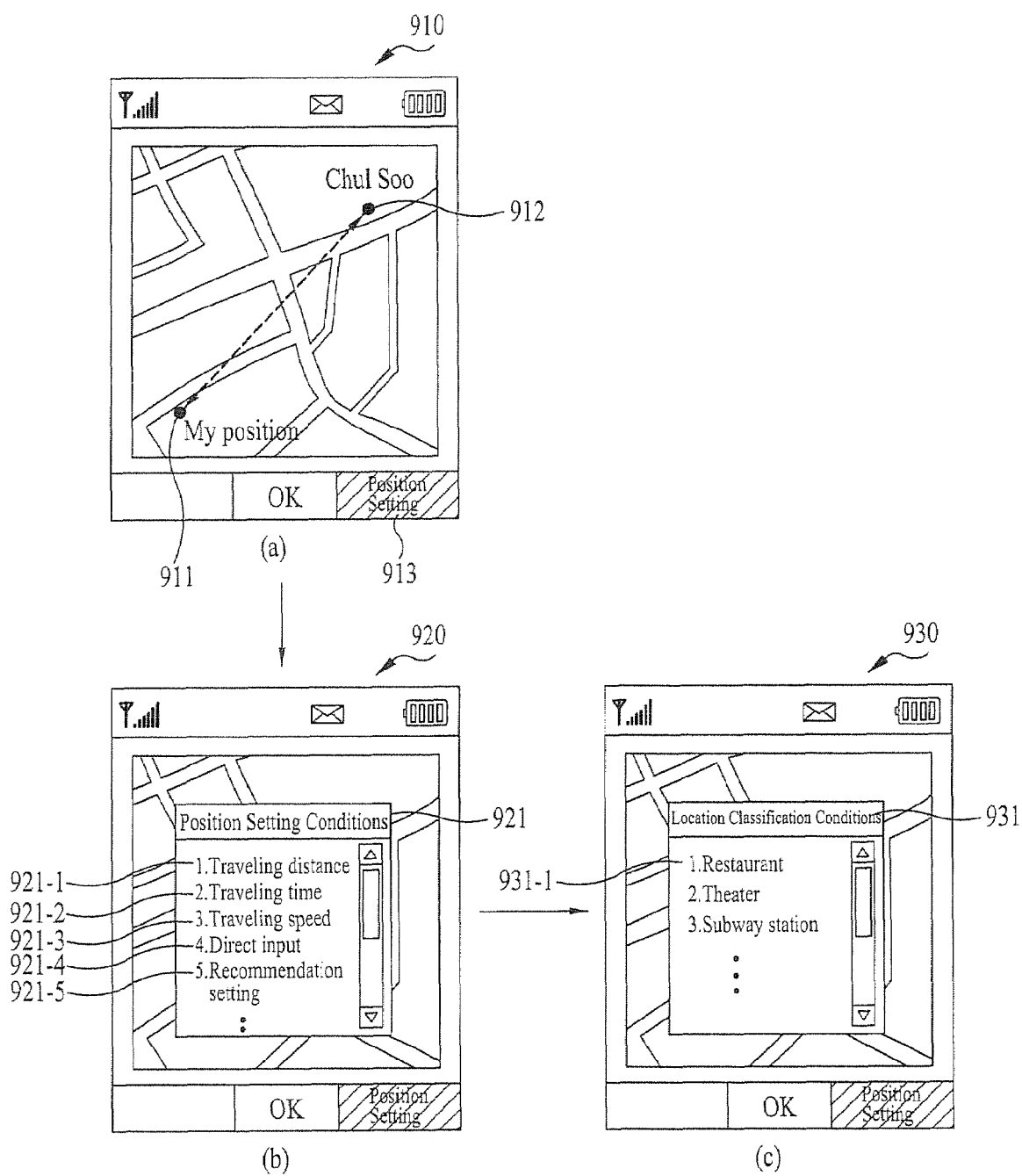
FIGS. 9A to 9F are diagrams of a screen on which images for obtaining new position information based on a plurality of position information according to one embodiment of the present invention are displayed.

Referring to FIG. 9A, the terminal 100 displays 'my position' 911 and Chul Soo's position 912 on a map based on position information of the terminal 100 and position information of Chul Soo [a].

If a position setting area 913 for receiving a command for entering new position information setting mode is activated, the terminal 100 displays a list 921 of data for obtaining new position information on the screen [b]. In this case, the list 921 can contain data for obtaining new position information such as a traveling distance, a traveling time, a traveling speed, a direct input, a recommendation setting and the like.

If the position setting area 913 is activated again in the state [b], the terminal 100 is able to display a list 931 of location classifications for selecting a type of a place corresponding to position information [c]. For instance, if 'restaurant' 931-1 is selected from the place classifications, the new position information can be limited to restaurants. At least one of the place classifications is able to be selected.

Optionally, the process described in the state [c] which is not mandatory for the present invention, can be omitted if necessary.

Selecting a traveling distance 921-1 to obtain new position information is explained with reference to FIG. 9B as follows. The terminal 100 obtains position information of 'destination 1' 941 located in the middle of a straight distance between 'my position' 911 and Chul Soo's position 912 as new position information, and displays 'destination 1' 941 on the map [d]. For instance, if the straight distance is '10 km', a distance between 'my position' 911 and 'destination 1' 941 becomes 5 km, and a distance between Chul Soo's position 912 and the location 941 becomes 5 km as well.

The terminal 100 obtains position information of 'destination 2' 951 located in the middle of an optimal route (e.g., route for a shortest necessary time) between 'my position' 911 and Chul Soo's position 912 as new position information, and then displays 'destination 2' 951 on the map. For instance, if the route distance is '14 km', a distance between 'my position' 911 and 'destination 2' 951 becomes 7 km and a distance between Chul Soo's position 912 and 'destination 2' 951 becomes 7 km as well.

Selecting a traveling time 921-2 as a condition for obtaining new position information is explained with reference to FIG. 9C as follows. The terminal 100 obtains position information of 'destination 3' 961 having a same time from 'my position' 911 Chul Soo's position 912 on an optimal route (e.g., a route having a shortest necessary time) between 'my position' 911 and Chul Soo's position 912 and then displays 'destination 3' 961 on the map [f]. For instance, the terminal 100 is able to obtain the position information of the location having 30 minutes travel time from 'my position' 911 to the location 961 or from Chul Soo's position 912 to 'destination 3' 961.

Selecting a direct input 921-4 as a condition for obtaining new position information is explained with reference to FIG. 9D as follows. If 'exit #3 of Yangjae station' is provided by a user as new position information as illustrated in FIG. 9D [g], the terminal 100 obtains position information of 'exit #3 of Yangjae station' and displays 'exit #3 of Yangjae station' 976 on the map.

Selecting a direct input 921-4 as a condition for obtaining new position information is further explained with reference to FIG. 9E as follows. If '10 minutes from me, 30 minutes from a correspondent party' is provided as data for obtaining new position information by a user as illustrated in FIG. 9E [i], the terminal obtains position information of 'destination 4' 986 taken 10 minutes from 'my position' 911 and also taken 30 minutes from Chul Soo's position and then displays 'destination 4' on the map.

Selecting a recommendation setting 921-5 as a condition for obtaining new position information is explained with reference to FIG. 9F as follows. The terminal 100 sets 'destination 5' 991 corresponding to new position information and then displays 'destination 5' 991 on the map FIG. 9F [k]. The recommended location can include a noted place, a light traffic place, a place reached in a shortest time, or a place located in a shortest distance. The recommended location is set as a default by the terminal 100 or can be set according to a condition selected by a user.

From the above description, it can be observed that the locations 951, 961, 971, 976 and 986 shown in FIGS. 9B to 9F correspond to destinations of the terminal 100 or Chul Soo's destination.

Referring again to FIG. 7, the terminal 100 obtains route information on new position information (S730). The route information can include a route from each of a plurality of the positions to the new position, a position and speed of the terminal 100 or of a correspondent terminal on the route, a travel time and distance to the new position information.

Figure 9B:
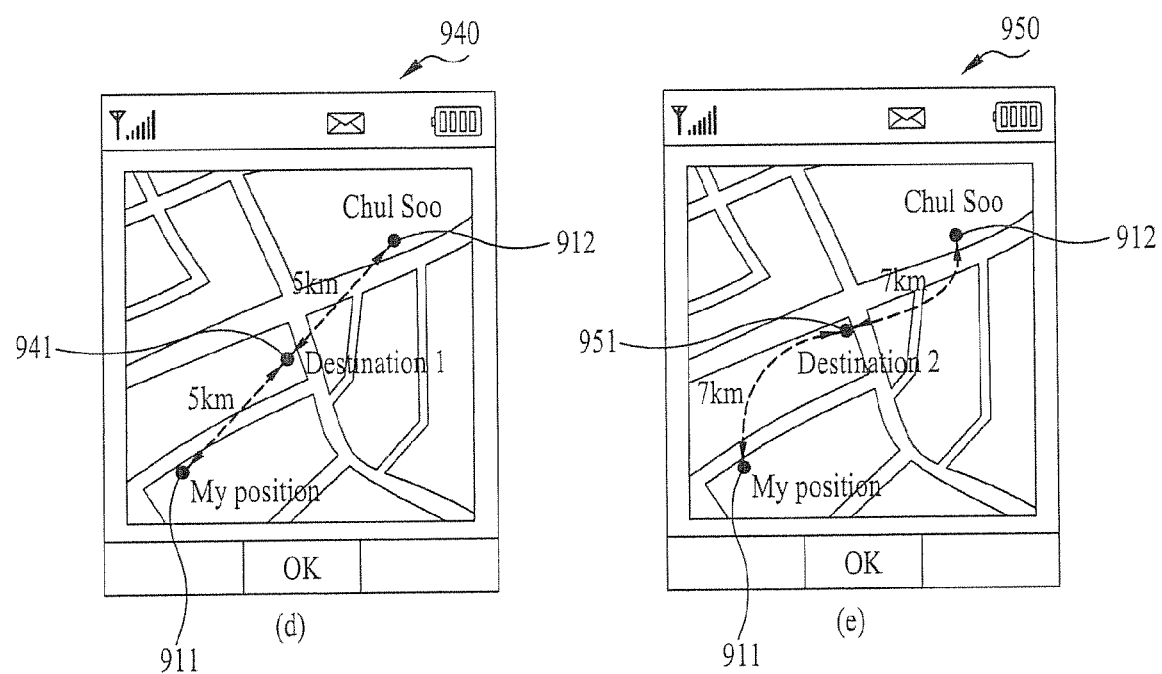
Figure 9C:
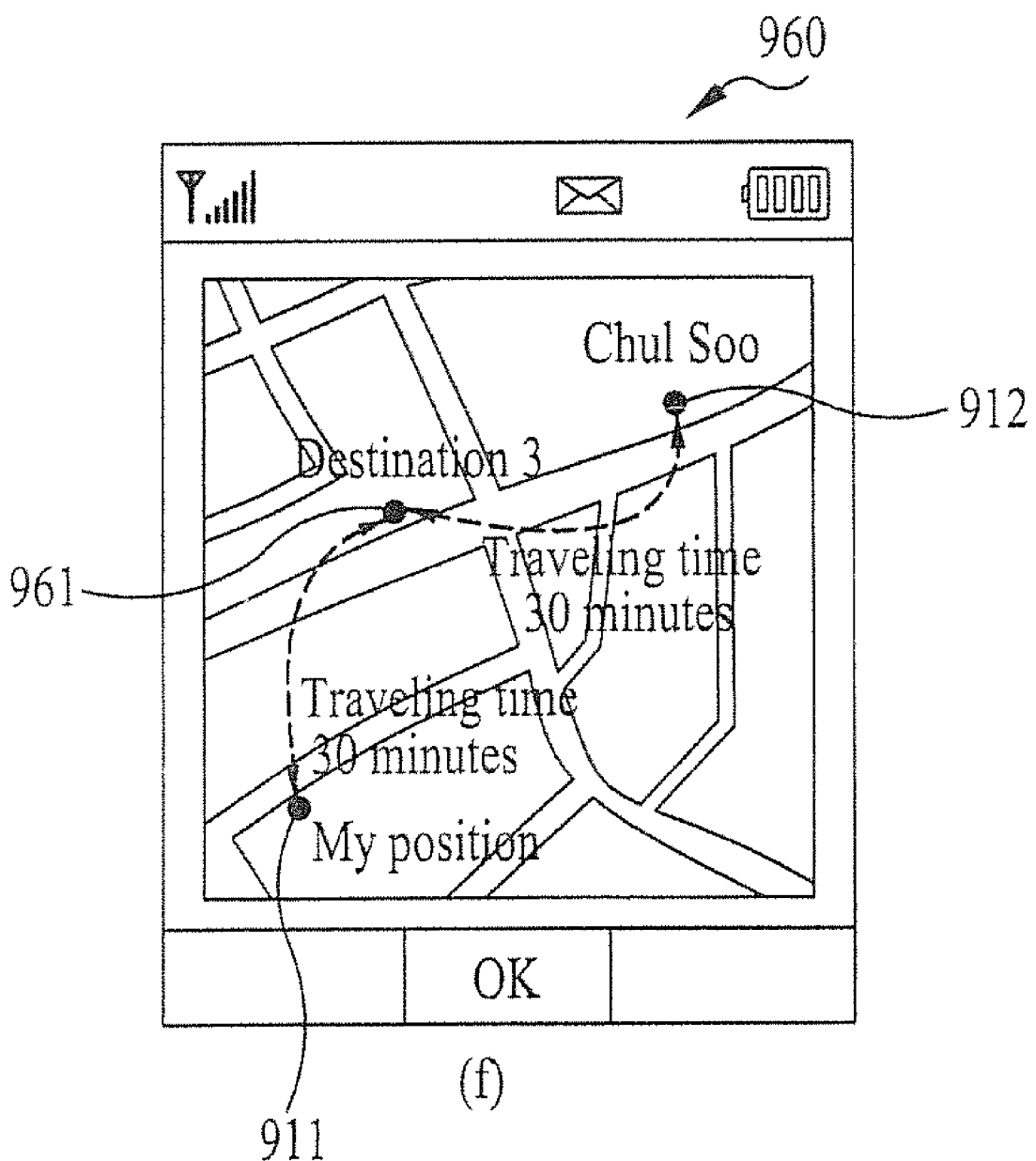
Figure 9D:
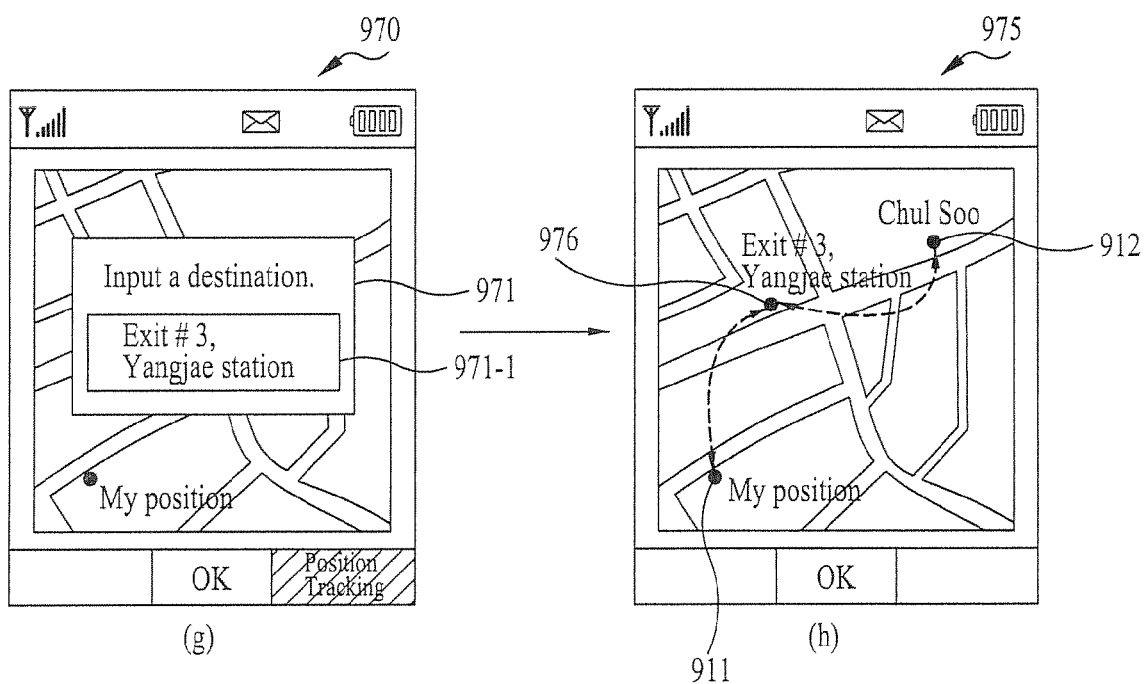
Figure 9E:
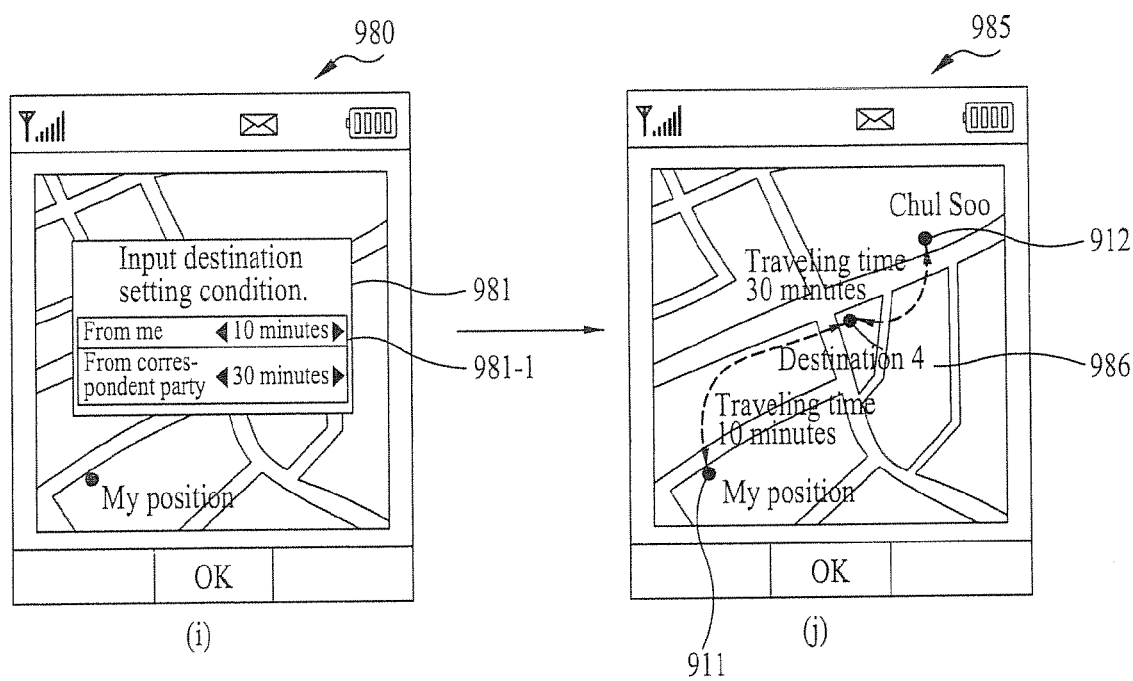
Figure 9F:
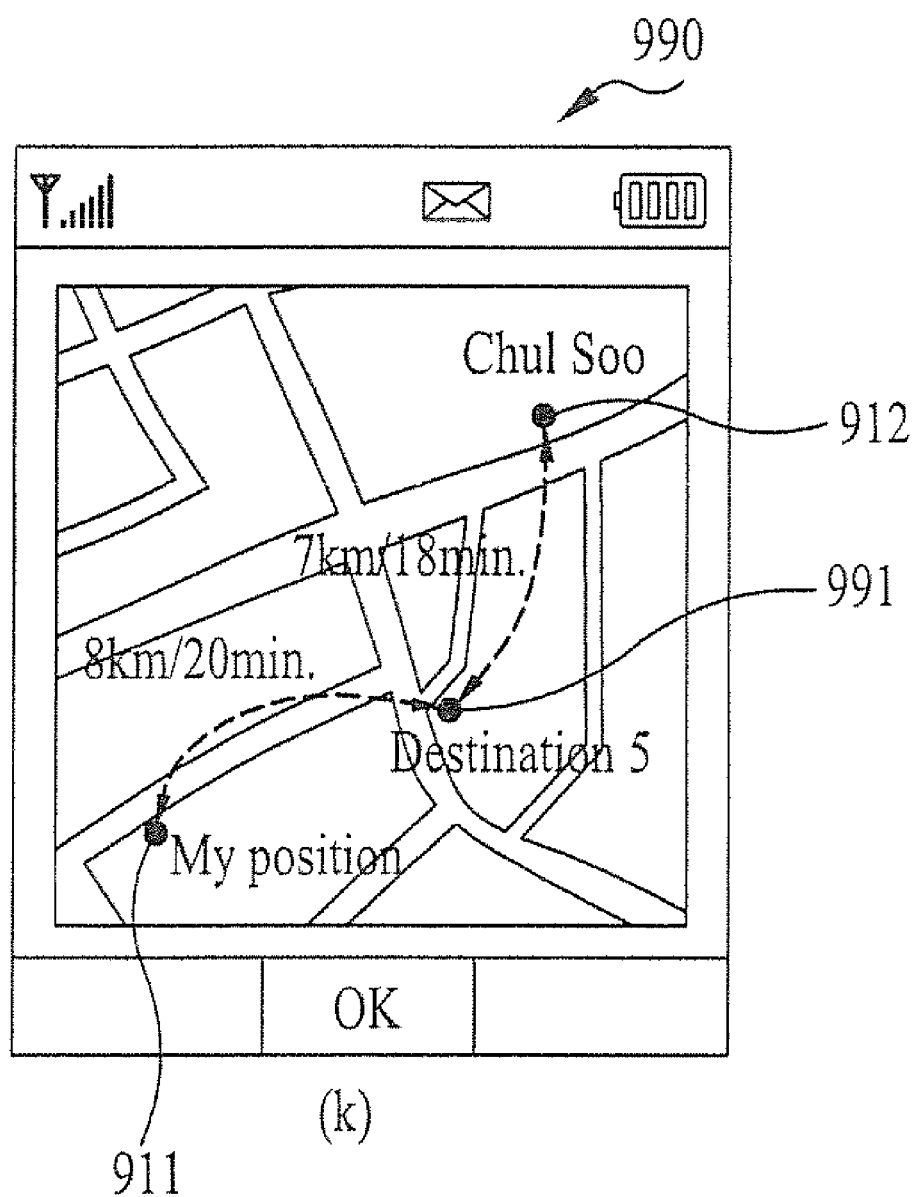

The terminal 100 generates a route from my position 911 to 'destination 1' 941 in FIG. 9B, a route from another terminal (e.g., a route from Chul Soo's location 912), to 'destination 1' 941 in FIG. 9B, or the terminal 100 can be provided with the route information or route information of another terminal from the external server 650. Alternatively, the terminal 100 receives route information from the correspondent terminal and then obtains the route information corresponding to the correspondent terminal.

Subsequently, the terminal 100 displays a route using the obtained route information [S740]. In this case, the route means a service that provides route information from the terminal 100 to a location corresponding to new position information or route information from a correspondent terminal to a location corresponding to new position information.

Figure 10:
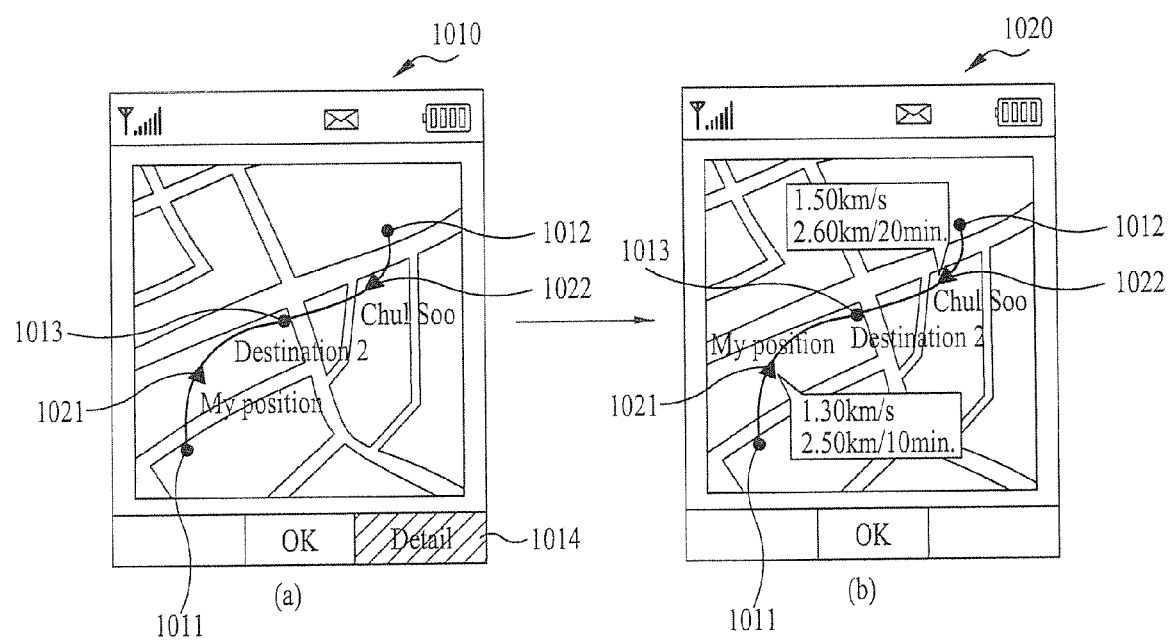
FIG. 10 is a diagram displaying route information of a route to a new destination from a location corresponding to each of a plurality of position information according to one embodiment of the present invention.

A process for displaying a route to a new destination from a location corresponding to each of a plurality of positions according to the present invention is explained with reference to FIG. 10 as follows. FIG. 10 is a diagram of a screen illustrating a route to 'destination 2' 941 from 'my position' 911 and Chul Soo's position 912 according to one embodiment of the present invention.

The terminal 100 displays a current position of the terminal 100 on a route from 'my position' 911 to 'destination 2' and Chul-Soo's position 912 on a route with a start point at 'my position' 911 and an end point at 'destination 2' 941.

If a detailed view area 1014 is selected, the terminal 100 provides route information at a current position 1021 of the terminal 100 or Chul-Soo's terminal 1022 (e.g., a remaining distance and travel time to 'destination 2' 941, etc.) in detail.

A process for displaying a route to a new destination from a location corresponding to each of a plurality of locations according to the present invention is explained with reference to FIG. 11 as follows.

Figure 11:
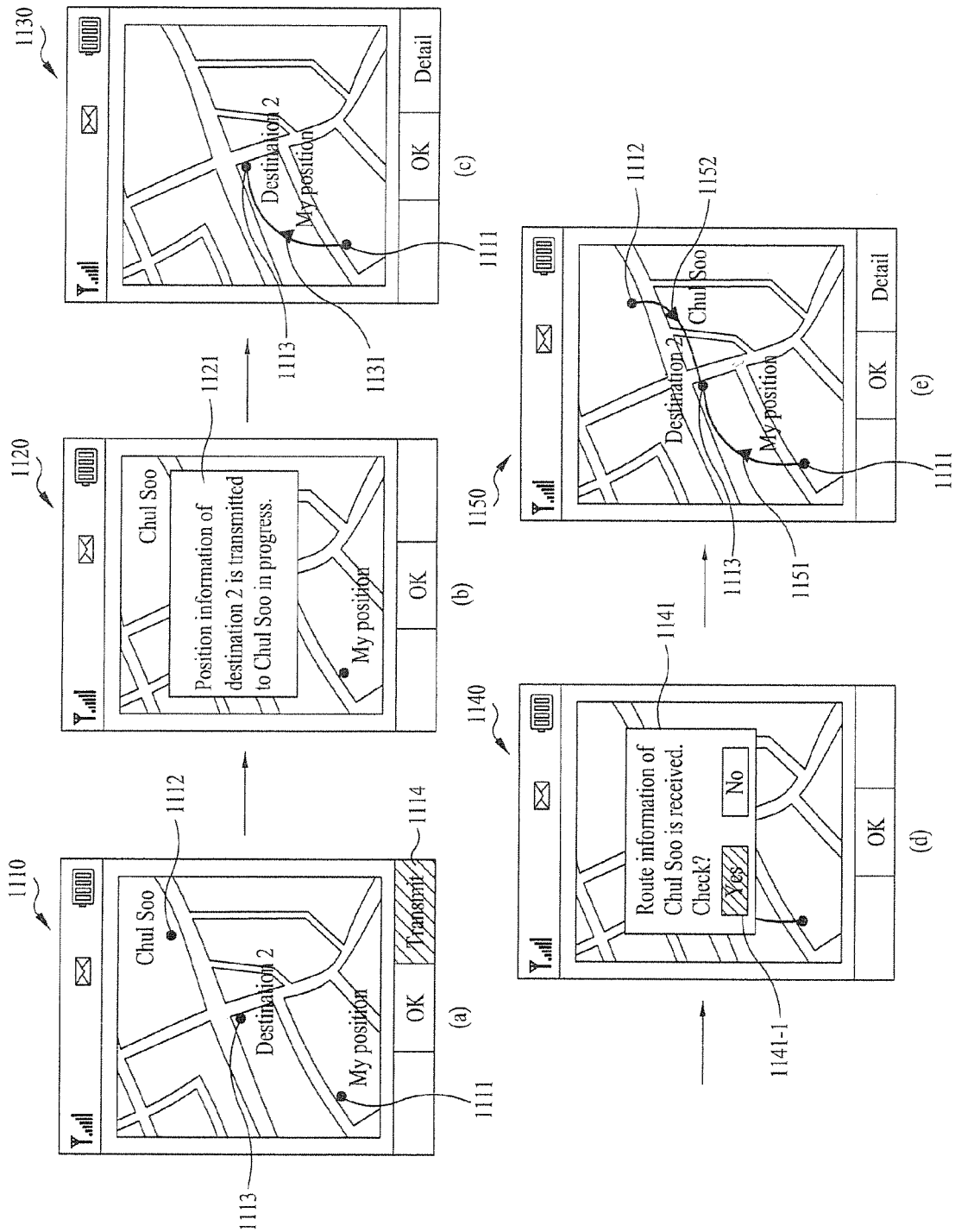
FIG. 11 is a diagram displaying route information of a route to a new destination from a location corresponding to each of a plurality of position information according to another embodiment of the present invention.

FIG. 11 is a display screen displaying a route to 'destination 2' 941 from 'my position' 911 and Chul Soo's position 912 according to another embodiment of the present invention. The terminal 100 displays 'my position (location of the terminal 100) 911, a location 912 of Chul-Soo's terminal, and a location 941 corresponding to 'destination 2' on a map [a].

If a command for transmitting new position information to Chul-Soo's terminal is selected, terminal 100 transmits the new position information of 'destination 2' 941 via the wireless communication unit 110 and displays a window 1121 for indicating that the new position information is being transmitted [b].

The terminal 100 provides a route based on route information of the terminal 100 while displaying the current position 1131 of the terminal 100 on a route from a start point at 'my position' 911 of the terminal 100 to 'destination 2' 941 [c].

If receiving route information from Chul-Soo's terminal in the state [c], the terminal 100 displays a window 1141 for querying whether to check the route information received from the Chul-Soo terminal [d].

If the route information has been received ('Yes' 1141-1 is selected), the terminal 100 provides a route based on the route information of Chul-Soo's terminal by displaying Chul-Soo terminal current position 1151 on a route to 'destination 2' 941 from a start position at Chul Soo's position 912 [e].

A process for transmitting route information to a correspondent terminal and a process for changing a destination or a route according to one embodiment of the present invention are explained with reference to FIG. 12 as follows.

Figure 12:
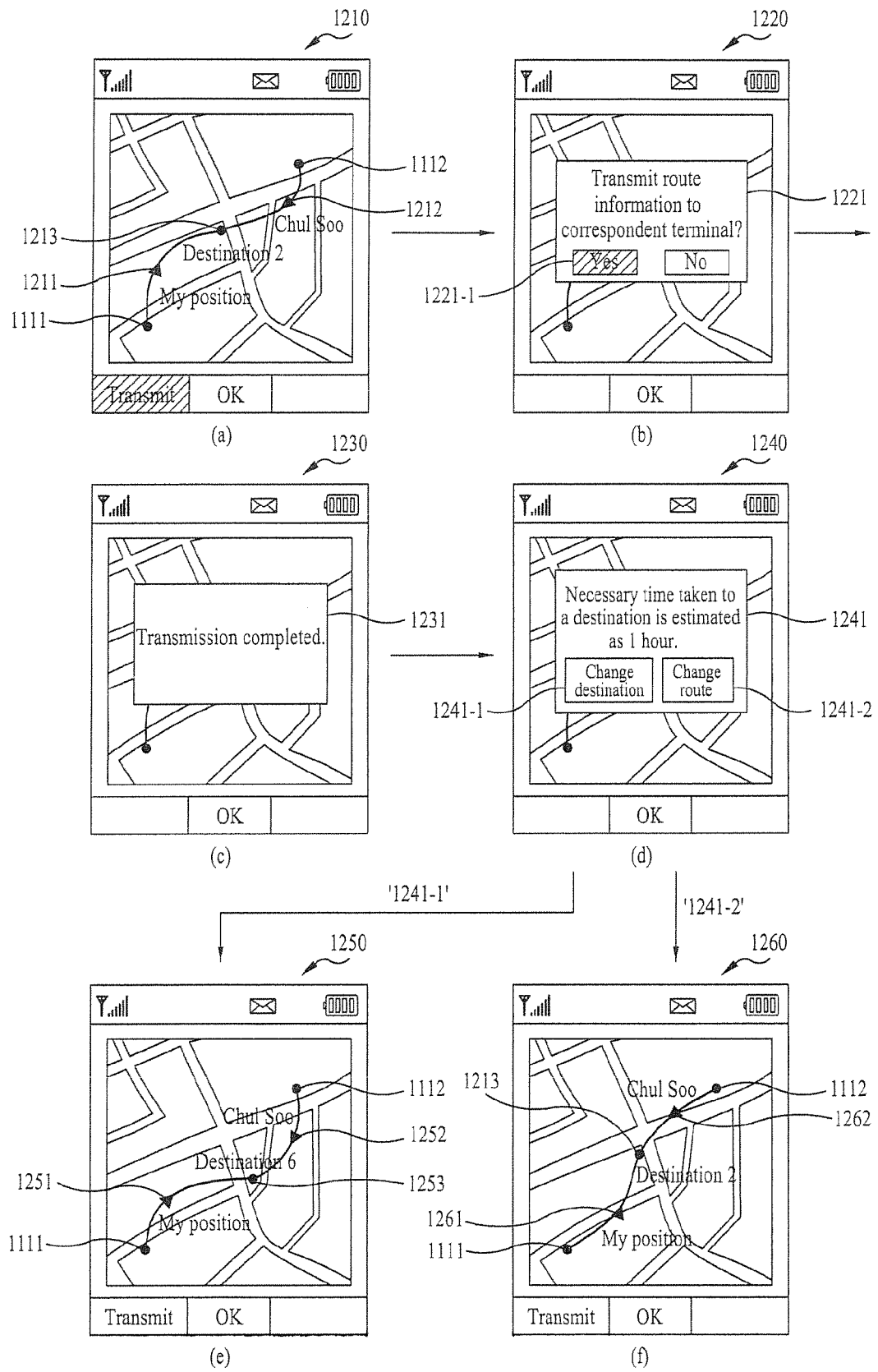
FIG. 12 is a diagram of a screen showing transmitting obtained route information to a correspondent terminal and a process for changing a destination/route according to one embodiment of the present invention.

FIG. 12 displays transmitting obtained route information to a correspondent terminal and a process for changing a destination or a route according to one embodiment of the present invention. The terminal 100 provides a route while displaying a current position 911 of the terminal on a route for the terminal 100 and a current position 912 of Chul-Soo's terminal on a route for Chul-Soo's terminal [a].

If a command for transmitting route information to the Chul-Soo terminal is activated [a], the terminal 100 displays a window 1221 querying whether to transmit the route information to Chul-Soo's terminal [b].

If 'Yes' 1221-1 is selected, the terminal 100 transmits the route information for the terminal 100 and or Chul-Soo's terminal to Chul-Soo's terminal and displays a window 1231 for indicating that the transmission is completed [c].

While the terminal 100 keeps providing the route information, if an estimated travel time to 'destination 2' 941 is delayed, the terminal 100 displays a window 1241 for enabling a user to select whether to change a destination or a route [d].

If 'destination change' 1241-1 is selected in state [d], the terminal 100 changes 'destination 2' 941 into 'destination 6' 1253 and then provides route information and a route based on the new location 1253 [e].

If 'route change' 1241-2 is selected d], the terminal 100 changes the present route to a new route and then provides information based on the changed route [f].

According to one embodiment of the present invention, the above-described position information managing method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). The computer can include the controller 180 of the terminal 100.

Accordingly, the present invention provides the following effects and advantages.

First of all, the present invention obtains new position information using a plurality of position information, thereby enabling a user to set an appropriate destination without providing destinations one by one.

Secondly, the present invention obtains new position information using a plurality of position information, thereby setting an optimal position to a meeting place by considering a plurality of user positions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal comprising:
   an input unit for receiving, from a user of the terminal, identification information identifying at least one remote terminal which is a mobile phone type terminal;
   a wireless communication unit for receiving position information of the terminal, the at least one remote terminal, and at least one destination, the position information of the at least one remote terminal received in response to the received identification information;
   a memory for storing the received position information of the at least one remote terminal according to the identification information;
   a controller for determining route information between the terminal and the at least one destination, and between the at least one remote terminal and the at least one destination based on the position information of the terminal, the at least one remote terminal, and at least one destination; and
   a display for displaying first travel information between the terminal and the at least one destination and second travel information between the at least one remote terminal and the at least one destination, the first and second travel information displayed concurrently according to the determined route information,
   wherein: the first travel information comprises at least a distance between the terminal and the at least one destination, a speed of the terminal traveling, an estimated travel time for the terminal, or a direction of travel from a position of the terminal to a position of the at least one destination;
   the second travel information comprises at least a distance between the at least one remote terminal and the at least one destination, a speed of the at least one remote terminal, an estimated travel time for the at least one remote terminal, or a direction of travel from a position of the at least one remote terminal to a position the at least one destination;
   the input unit comprises at least a keypad, a touchpad, or a touchscreen display;
   the input unit further receives an input for setting a first condition and a second condition for obtaining a position of the at least one destination, the first condition and the second condition having different values;
   the first condition is related to the terminal and the at least one destination and the second condition is related to the at least one remote terminal and the at least one destination, the first condition and the second condition each comprising estimated travel time to the at least one destination;
   the controller is further for determining that the estimated travel time has been increased greater than a threshold time while displaying the first and second travel information according to the first condition and the second condition;
   the display displays a window for prompting a user whether to change the at least one destination to a new destination or to change the route information from a currently displayed route to a new route when the controller determines that the estimated travel has been increased; and
   the input unit further receives an input for changing the at least one destination or the route information in response to the prompted window.

2. The terminal of claim 1, wherein the identification information further comprises a name.

3. The terminal of claim 1, wherein the at least one remote terminal comprises two or more remote terminals.

4. The terminal of claim 1, wherein the displayed second travel information further comprises the direction of travel from the position of the at least one remote terminal to the position of the at least one destination.

5. The terminal of claim 1, wherein the wireless communication unit transmits the position information of the at least one destination to the at least one remote terminal and receives from the at least one remote terminal the route information between the at least one remote terminal and the at least one destination.

6. The terminal of claim 1, wherein the wireless communication unit transmits to the at least one remote terminal the route information between the terminal and the at least one destination.

7. A method of obtaining route information in a terminal, the method comprising:
   receiving from a user, via an input unit of the terminal, identification information identifying at least one remote terminal which is a mobile phone type terminal;
   receiving position information of the terminal, the at least one remote terminal, and at least one destination, the position information of the at least one remote terminal received in response to the received identification information;
   storing the received position information of the at least one remote terminal according to the identification information;
   determining route information between the terminal and the at least one destination, and between the at least one remote terminal and the at least one destination based on the position information of the terminal, the at least one remote terminal, and the at least one destination; and
   displaying first travel information between the terminal and the at least one destination and second travel information between the at least one remote terminal and the at least one destination concurrently according to the determined route information,
   wherein:
   the first travel information comprises at least a distance between the terminal and the at least one destination, a traveling speed of the terminal, an estimated travel time for the terminal, or a direction of travel from a position of the terminal to a position of the at least one destination;
   the second travel information comprises at least a distance between the at least one remote terminal and the at least one destination, a speed of the at least one remote terminal, an estimated travel time for the at least one remote terminal, or a direction of travel from a position of the at least one remote terminal to a position of the at least one destination;

the input unit comprises at least a keypad, a touchpad, or a touchscreen display; and the method further comprises:

receiving, via the input unit, an input for setting a first condition and a second condition for obtaining a position of the at least one destination, the first condition and the second condition having different values, wherein the first condition is related to the terminal and the at least one destination and the second condition is related to the at least one remote terminal and the at least one destination, the first condition and the second condition each comprising estimated travel time to the at least one destination;

determining that the estimated travel time has been increased greater than a threshold time while displaying the first and second travel information according to the first condition and the second condition;

displaying a window for prompting a user whether to change the at least one destination to a new destination or to change the route information from a currently displayed route to a new route when the controller determines that the estimated travel has been increased; and receiving, via the input unit, an input for changing the at least one destination or the route information in response to the prompted window.

8. The method of claim 7, wherein the identification information further comprises a name.

9. The method of claim 7, wherein the at least one remote terminal comprises two or more remote terminals.

10. The method of claim 7, wherein the displayed second travel information further comprises the direction of travel from the position of the at least one remote terminal to the position of the at least one destination.

11. The method of claim 7, further comprising transmitting the position information of the at least one destination to the at least one remote terminal and receiving from the at least one remote terminal the route information between the at least one remote terminal and the at least one destination.

12. The method of claim 7, further comprising transmitting to the at least one remote terminal the route information between the terminal and the at least one destination.

13. A route information system comprising:

a terminal for receiving position information of the terminal, at least one remote terminal, and at least one destination; and a server for transmitting position information of the terminal, the at least one remote terminal, and the at least one destination, wherein the terminal comprises:

an input unit for receiving, from a user of the terminal, identification information identifying the at least one remote terminal which is a mobile phone type terminal;

a wireless communication unit for receiving the position information of the at least one remote terminal in response to the received identification information;

a memory for storing the received position information of the at least one remote terminal according to the identification information; and a display for displaying first travel information between the terminal and the at least one destination and second travel information between the at least one remote terminal and the at least one destination, the first and second travel information displayed concurrently according to the determined route information, wherein: the first travel information comprises at least a distance between the terminal and the at least one destination, a speed of the terminal traveling, an estimated travel time for the terminal, or a direction of travel from a position of the terminal to a position of the at least one destination;

the second travel information comprises at least a distance between the at least one remote terminal and the at least one destination, a speed of the at least one remote terminal, an estimated travel time for the at least one remote terminal, or a direction of travel from a position of the at least one remote terminal to a position of the at least one destination;

the input unit comprises at least a keypad, a touchpad, or a touchscreen display;

the input unit further receives an input for setting a first condition and a second condition for obtaining a position of the at least one destination, the first condition and the second condition having different values;

the first condition is related to the terminal and the at least one destination and the second condition is related to the at least one remote terminal and the at least one destination, the first condition and the second condition each comprising estimated travel time to the at least one destination;

the controller is further for determining that the estimated travel time has been increased greater than a threshold time while displaying the first and second travel information according to the first condition and the second condition;

the display displays a window for prompting a user whether to change the at least one destination to a new destination or to change the route information from a currently displayed route to a new route when the controller determines that the estimated travel has been increased; and the input unit further receives an input for changing the at least one destination or the route information in response to the prompted window.

14. The system of claim 13, wherein the identification information further comprises a name.

15. The system of claim 13, wherein the at least one remote terminal comprises two or more remote terminals.

16. The system of claim 13, wherein the displayed second travel information comprises the direction of travel from the position of the at least one remote terminal to the position of the at least one destination.

17. The system of claim 13, wherein the terminal transmits the position information of the at least one destination to the server and receives from the server the travel information between the at least one remote terminal and the at least one destination.

18. The system of claim 13, wherein the terminal transmits to the server the travel information between the terminal and the at least one destination.

19. The terminal of claim 1, wherein the position information of the at least one remote terminal stored in the memory is updated periodically by receiving current position information of the at least one remote terminal.

20. The terminal of claim 1, wherein the identification information is received via at least the keypad, the touchpad, or the touchscreen and comprises a telephone number corresponding to the at least one remote terminal.

21. The terminal of claim 1, wherein the display is further for displaying a map including both the first travel information and the second travel information.

\* \* \* \* \*